United States Patent [19]
Ozaki

[11] Patent Number: 5,915,065
[45] Date of Patent: Jun. 22, 1999

[54] MAGNETIC RECORDING AND REPRODUCING METHOD

[75] Inventor: Hidetoshi Ozaki, Yokohama, Japan

[73] Assignee: Victor Company of Japan, Ltd., Yokohama, Japan

[21] Appl. No.: 08/831,378

[22] Filed: Apr. 1, 1997

[30] Foreign Application Priority Data

Apr. 2, 1996 [JP] Japan ................................. 8-106356

[51] Int. Cl.$^6$ ........................................... H04N 5/76
[52] U.S. Cl. .............................. 386/56; 386/57; 386/124
[58] Field of Search .......................... 386/52, 57, 78, 386/124, 56, 73, 46; 360/32, 55, 64, 72.1, 72.3; H04N 5/76

[56] References Cited

U.S. PATENT DOCUMENTS 4,796,105  1/1989  Mawatari .................................. 386/56

Primary Examiner—Huy T. Nguyen
Attorney, Agent, or Firm—Michael M. Meller

[57] ABSTRACT

In a helical-scan-type magnetic recording and playback method for forming diagonal tracks on a magnetic tape while recording and playing back digital data signals, the record and playback heads are installed on a rotating drum in a manner that enables the signal transfer delay associated with the record and playback signal processing of the digital data signal to be absorbed. The recording and playback is performed using a track pattern formed on the magnetic tape with the start and end points of the tracks located at distances of X and (L−X), respectively, from the lower edge of the tape, with L being the width of the tape, and X given by the equation:

$$X=0.65+n \times p \times \cos\theta$$

where n is the signal transfer delay time associated with the signal processing required to record and playback a digital data signal expressed as a number of tracks, p is the track pitch, and θ is the angle of inclination of the diagonal tracks relative to the lower edge of the tape.

2 Claims, 7 Drawing Sheets

MAGNETIC RECORDING AND REPRODUCING METHOD

FIELD OF THE INVENTION

The present invention relates to a magnetic recording and playback method that forms a track pattern for performing accurate editing in a helical-scan-type magnetic recording and playback system for recording and playback of digital data signals.

BACKGROUND OF THE INVENTION

As shown in FIG. 1, a prior editing system comprises: a VTR-A (1) for performing playback; a VTR-B (2), for recording a video signal 1a from VTR-A (1); a synchronization signal generator means 3 for synchronizing the signal processing systems of VTR-A (1) and VTR-B (2); a control means 4 for synchronously driving and controlling the record/playback operation of VTR-A (1) and VTR-B (2), respectively, based on editing time code TA played back by VTR-A (1) and editing time code TB played back by VTR-B (2); and a display means 5 for monitoring editing results.

The operation of the system will be described for the case in which, as shown in FIG. 2, the nth through (n+m)th frames of a video signal 1a being played back by VTR-A (1) from a magnetic tape on which it was previously recorded, is insertion-recorded (insertion-edited) onto a previously recorded magnetic tape loaded in VTR-B (2). In this particular system, the magnetic tapes are housed in cassettes which are loaded in the VTRs.

VTR-A (1) and VTR-B (2) are driven in frame synchronization with the video signal 1a, based on synchronization signals 3a and 3b generated by the synchronization signal generator means 3. That is, the tape transport and signal transfer systems are synchronized between VTR-A (1) and VTR-B (2). The video signal 2a monitored by display means 5 can be the playback or the record video signal from either VTR-A (1) or VTR-B (2), respectively. As an alternative, two display means 5 may be provided (one for each VTR).

In order to perform professional editing with VTRs, the time, that is, positional relationship between the record and the playback video signals on the magnetic tape must be precisely controlled. To accomplish this, time codes are recorded on the magnetic tapes on which the video signals are recorded. One way of doing this is to record the time code in a prescribed track running length on the tape or to insert the time code in the vertical blanking period of the video signal. The location at which recording is to start, and the location at which playback is to start, and so forth, can then be specified based on this time code.

Referring now to FIG. 2, assume that the video between the nth and (n+m)th frames of the signal being played back by VTR-A (2) is to be inserted in the segment between the Nth and (N+M)th frames of the video previously recorded on the tape loaded in VTR-B (2). When the nth frame of video is output by VTR-A (1), the control means 4 causes VTR-B (2) to start recording the video portion to be inserted, and when the (n+m)th frame of video is output by VTR-A (1), the control means 4 causes VTR-B (2) to stop recording. Assume that an input means (not illustrated) sends the control means 4 its instructions on where to start and stop recording.

It takes time for the playback signal picked up by the playback magnetic head of VTR-A (1) to pass through the playback signal processing system VTR-A (1) and be input to VTR-3 (2) as video signal 1a. It also takes time for this video signal 1a to pass through the record signal processing system of VTR-B (2) and be applied to its record magnetic head. If we assume that this processing time is small enough to be negligible for all practical purposes, the above insertion editing process can be performed with no problem.

In analog VTRs, it takes on the order of a few microseconds to perform the signal processing required to process an input video signal for recording by the magnetic head. It similarly takes only a few microseconds to process a recorded playback signal picked up by the magnetic head for output as a reproduced video signal. In practice, then, with analog VTRs, the above insertion editing can be performed without problems.

In a digital VTR, however, the video signal is converted to a digital data signal, which then undergoes data compression prior to recording. The digital video signal must therefore be decompressed when it is played back. When insertion editing is performed using digital VTRs, the signal processing required to record the signal (data compression, error-correction coding, shuffling, etc.) takes more than 1/30th of a second (the length of a video frame). The complementary processes on the playback end take just as long.

To perform insertion editing with digital VTRs as described above, for example, it would take two frame times for VTR-A (1) to output, process, and playback a signal 1a and two additional frame times for VTR-B (2) to input, process, and record it, for a total of four frame times.

FIG. 3 shows the recorded states of the V-B tape before and after editing. If editing were performed as described above, with the nth frame of the VTR-A (1) playback video used to time the start of the edit, frames (n−2) through (n+m−1) of the VTR-A (1) video would actually end up being recorded over frames (N+2) through (N+m+2) of the pre-edit VTR-B (2) video, as shown in FIG. 3. In other words, the inserted video will start on the edited tape two frames late, and its content will be delayed by four frames.

The following three methods might be considered as ways of correcting this editing offset.

(1) Set the timing of the VTR-A (1) output two frames ahead, and advance VTR-B (2) playback output timing ahead of the VTR-A (1) time code by two frames.

(2) Advance the VTR-A (1) time code output four frames ahead of the video output, and delay playback/record operations during editing (via the instructions provided to the control means by the user, for example) by two frames relative to the actual playback/record operation.

(3) In the VTRs, use separate record and playback heads mounted on the rotating drum so that the tape reaches the playback head four frames before it reaches the record head, and delay playback/record operations during editing by two frames relative to the actual playback/record operation.

With the above methods (1) and (2), however, there is a problem in that if digital VTRs with no recording or playback delays and digital VTRs with different delay times are mixed in the system, the time code timing and record/playback timing would both have to be adjusted to within precise tolerances, complicating the operation of the system.

With method (3), if, as shown in FIG. 4, the playback head were positioned ahead of the record head by from one track to a few tracks, for example, since there is not much distance between the points at which the record and playback heads first come in contact with the edge of the magnetic tape (the distance between Y1 and Y2 in FIG. 4), the playback head would be able to reproduce video from the leading track. Point 41, where the playback head first comes in contact with the edge of the magnetic tape, is actually inside the track, as shown in FIG. 4. The shaded part is hereafter identified as a preamble portion 42. This preamble portion 42 is recorded ahead of the digital signal area and is used to generate a clock signal required to reproduce the digital signal. Accordingly, there will be no problem as long as the playback head can start picking up data from the preamble portion 42. If, however, the playback head is positioned more than a few tracks ahead of the record head, as shown in FIG. 4, then point 43, at which the playback head now first comes in contact with the magnetic tap, would already be in the portion of the tape in which the digital signal is recorded. There would then be a problem in that it would not be possible to reproduce the entire digital signal. Also, since the preamble portion 42 could not be recovered, it would not be possible to generate the clock signal properly.

SUMMARY OF THE INVENTION

It is an objective of this invention to provide a digital data signal recording and playback method wherein insertion editing can be performed using record and playback heads which are angularly displaced from one another, as well as being offset on different planes lying normal to the longitudinal axis of the rotating drum on which the record and playback heads are installed.

It is a further objective of this invention to provide a magnetic recording and playback method for forming diagonal tracks on magnetic tape while recording and playing back a digital data signal, wherein a record head for recording the diagonal tracks and a playback head for playing back the diagonal tracks are installed on a rotating drum so that the record head and the playback head are offset from one another on different planes lying normal to the longitudinal axis of the rotating drum with the offset distance providing a time differential between playback and record sufficient to absorb a signal transfer delay time associated with the record processing and the playback processing of the digital data signal; and wherein, with L as the width of said magnetic tape, and with the lower edge of sod magnetic tape as a reference edge, each of the diagonal tracks is recorded by the record head, or played back by the playback head such that a point local X distance from the reference edge is the starting point, and a point located (L–X) distance from the reference edge is the end point of each of said tracks, with X computed as follows:

$$X = 0.65 + n \times p \times \cos\theta$$

where n is the height difference expressed in number of tracks, p is the track pitch, and θ is the angle of inclination of said diagonal tracks with respect to the lengthwise direction of said magnetic tape.

It is a still further objective of the present invention to provide a magnetic recording and playback method wherein, with 12.65 mm as the width of the magnetic tape, when a digital signal corresponding to one frame of video is recorded in from 10 to 12 tracks at a track pitch of 20 $\mu$m, the diagonal tracks have their starting points located 1.70±0.05 mm from the reference edge, and their end points located 10.95±0.05 mm from the reference edge.

BRIEF DESCRIPTION OF THE DRAWINGS

The above and other objects, features, and advantages of the present invention will become more apparent from the following detailed description taken with the accompanying drawings, in which.

DETAILED DESCRIPTION OF THE INVENTION

In the following paragraphs, a working example of the present invention will be described, with reference to the drawings. Items that have already been discussed above will be referred to by the same reference numbers in this description, and will not be described.

In the magnetic recording and playback system of the present invention, after the incoming video signal is converted to digital data, it goes through prescribed digital record signal processing and has an error correction code appended to it, to obtain the data-compressed record signal. Magnetic heads mounted on a rotating drum (the same as in commonly known helical scan VTRs) then record this video signal on a magnetic tape routed over the drum, forming a prescribed pattern on the tape as the recording process proceeds. At playback, the above tape pattern is scanned to recover the recorded signal, which is then subjected to playback signal processes complementary to the above record signal processing, to decompress and reproduce the original digital signal.

Figure 1:
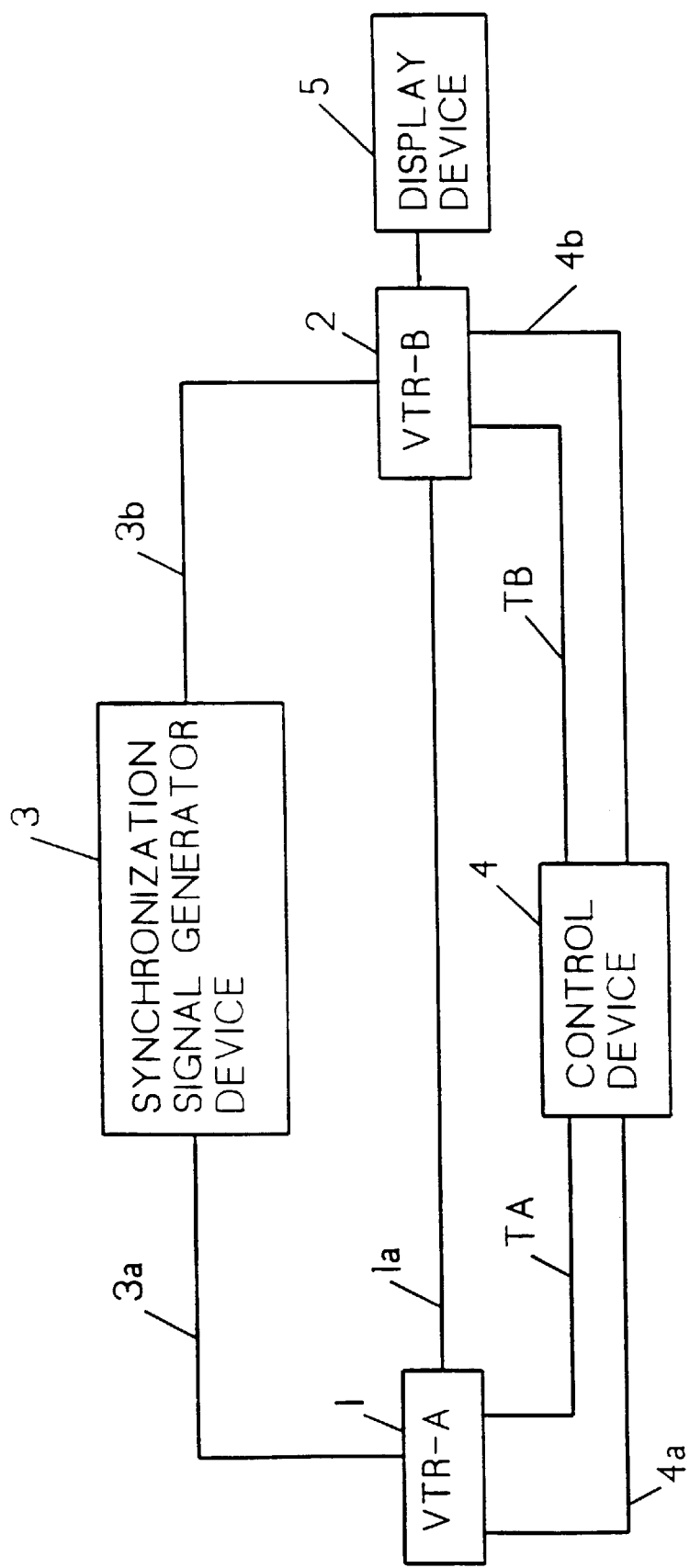
FIG. 1 is a block diagram for explaining the operation of an editing system using conventional recording and playback methods.
Figure 2:
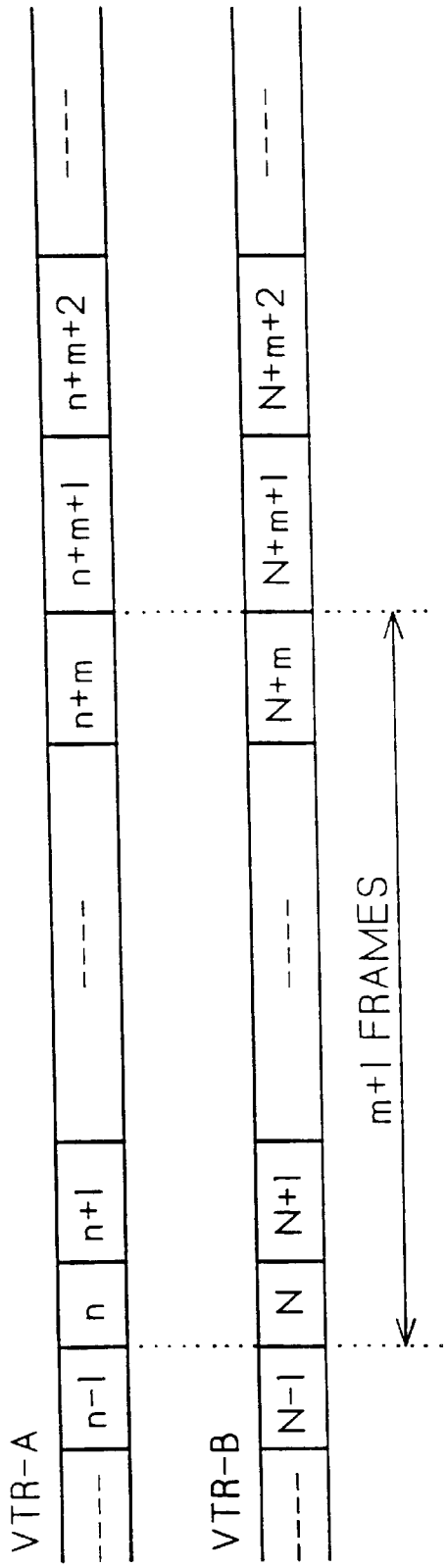
FIG. 2 illustrates insertion editing using analog VTRs.
Figure 3:
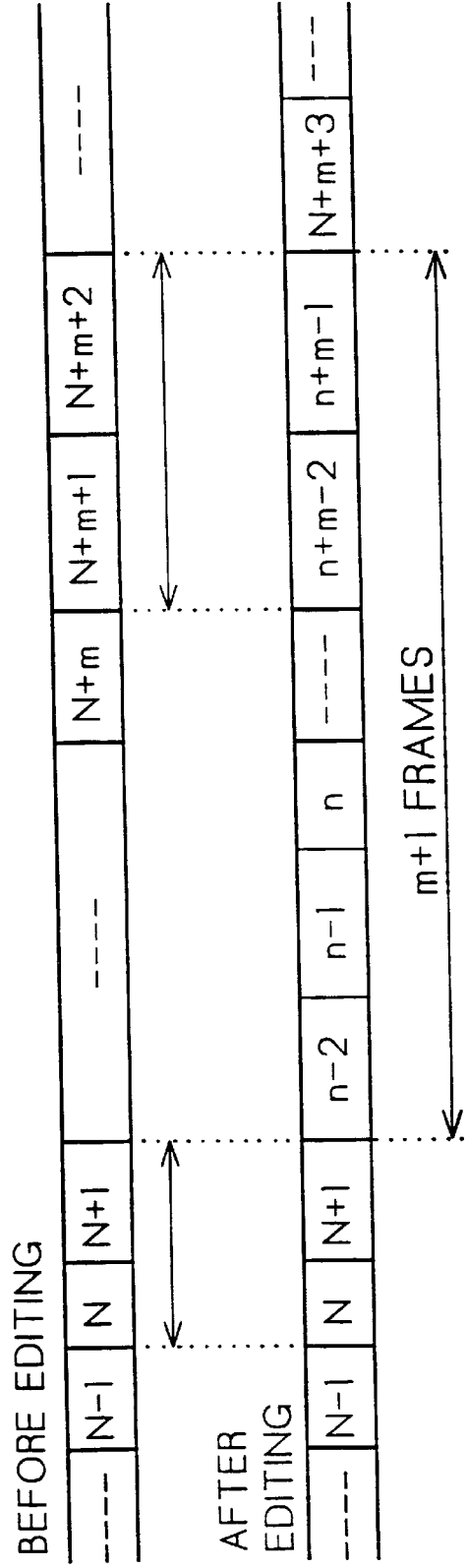
FIG. 3 illustrates insertion editing using digital VTRs.
Figure 4:
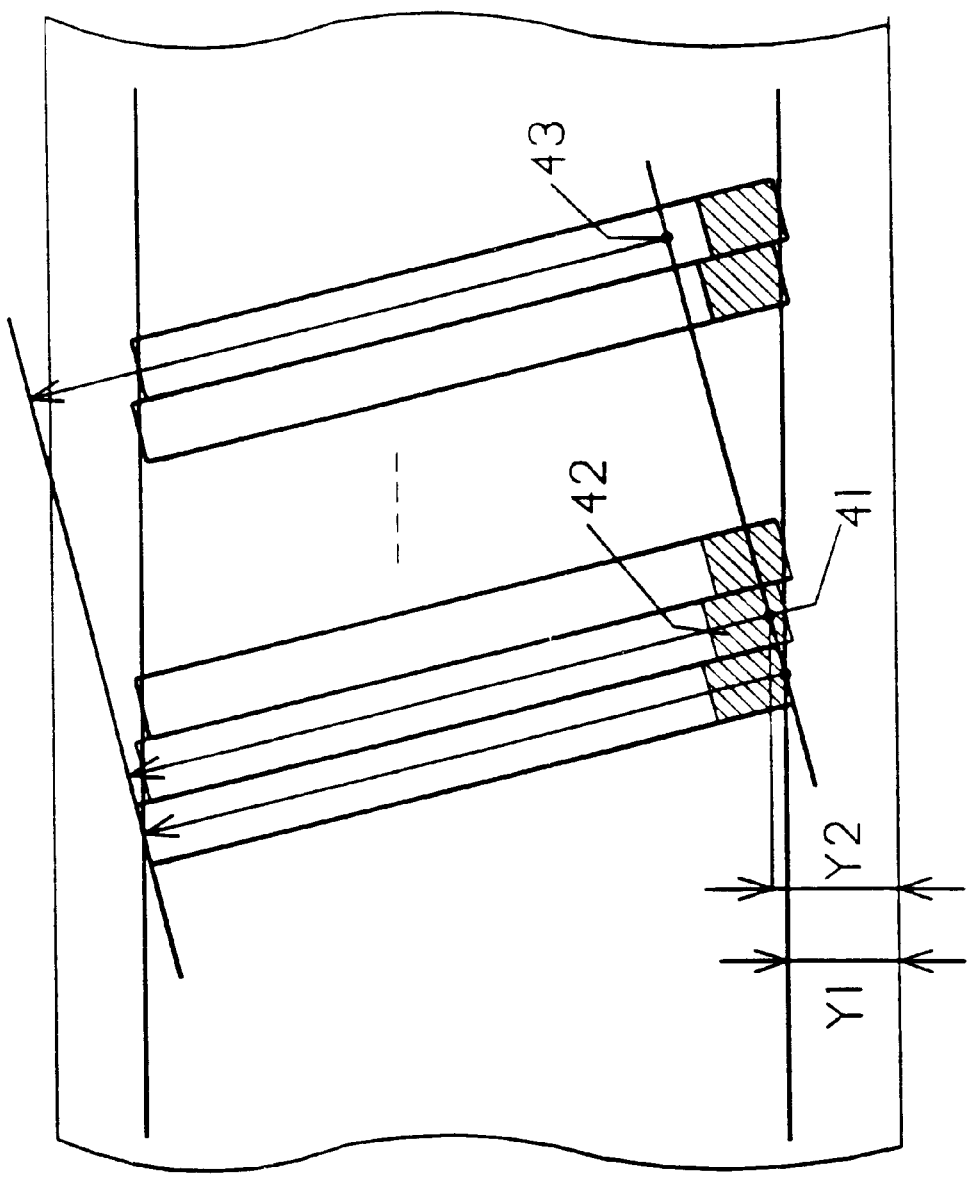
FIG. 4 illustrates patterns formed on the magnetic tape when conventional recording and playback methods are used.
Figure 5:
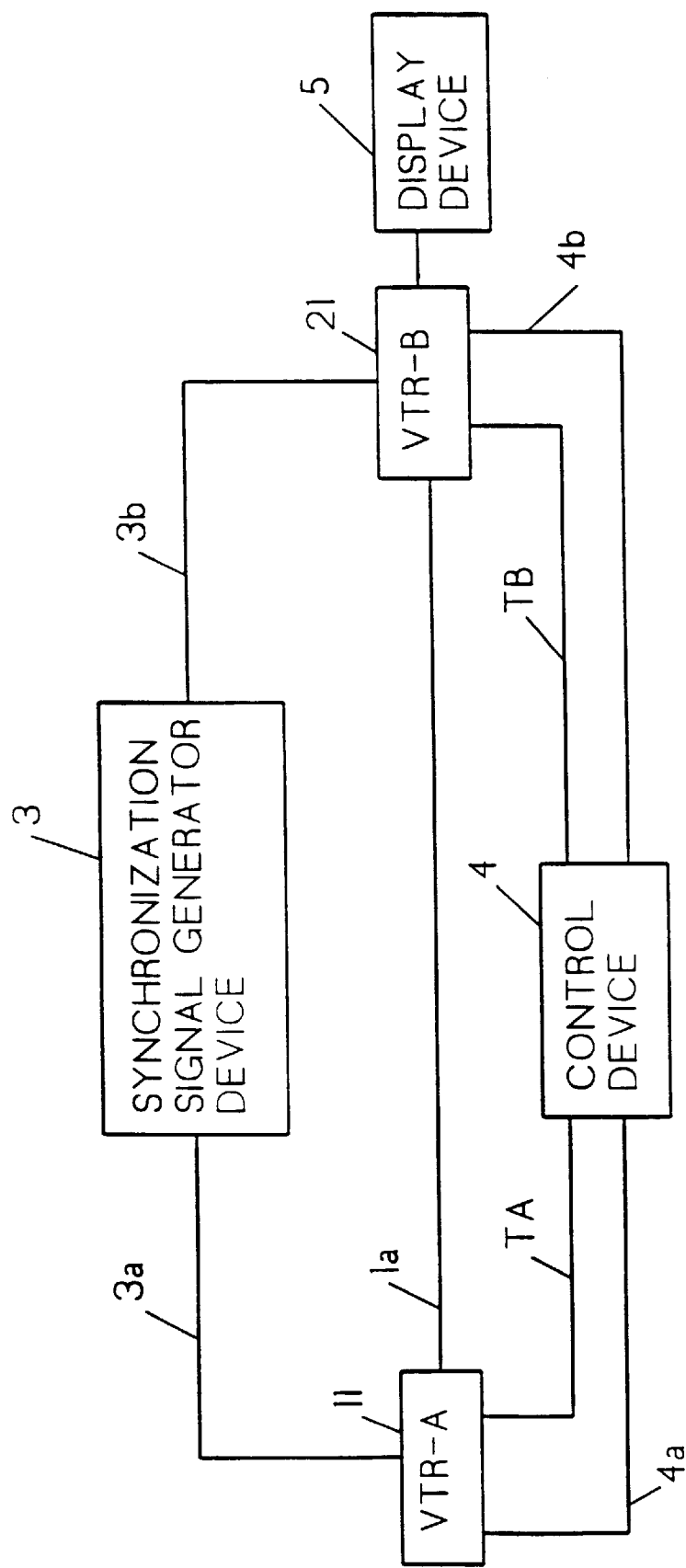
FIG. 5 shows an editing system using the magnetic recording and playback method of the present invention.

FIG. 5 shows an editing system using the magnetic recording and playback method of the present invention. VTR-A (11) is a magnetic recording and playback device for performing playback, and VTR-B (21) is a magnetic recording and playback device for recording video signal 1a from VTR-A (11). In addition, this editing system comprises a synchronization signal generator means 3 for synchronizing VTR-A (11) and VTR-B (21); a control means 4 for synchronously operating VTR-A (11) and VTR-B (21), and controlling the respective record/playback operation of VTR-A (11) and VTR-B (21), based on an editing time code TA played back by VTR-A (11), and an editing time code TB played back by VTR-B (21); and a display means 5 for monitoring the video signal 2a.

Figure 6:
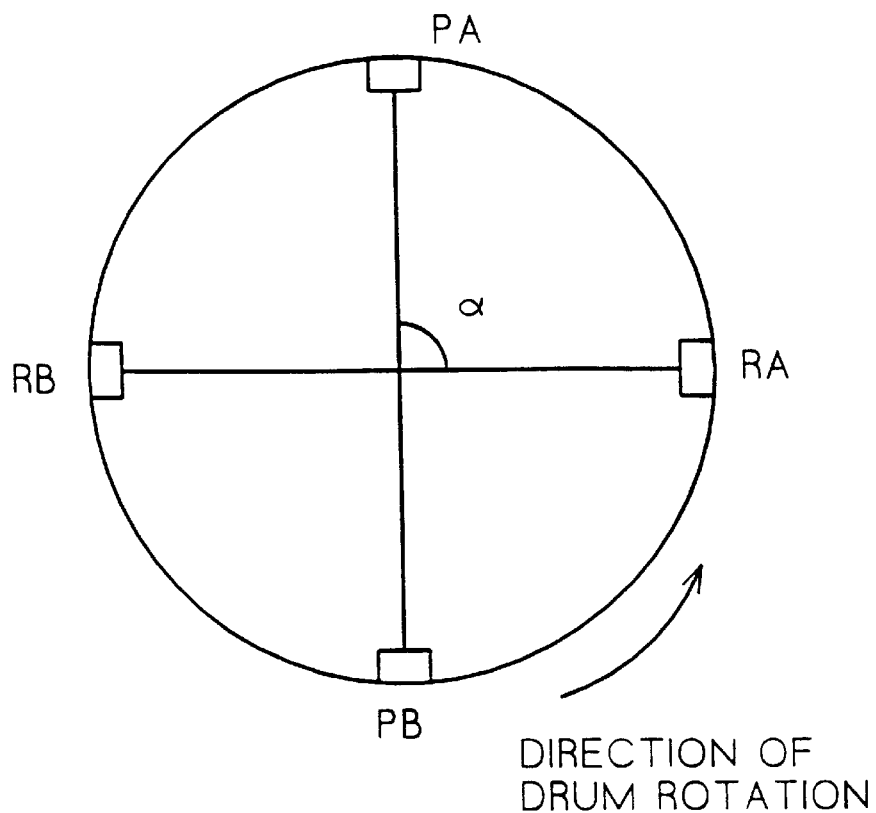
FIG. 6 shows the structure of the magnetic head assembly of VTR-B (21) of FIG. 5.

FIG. 6 shows the structure of the magnetic head assembly of VTR-B (21) of FIG. 5. The record heads RA and RB are installed on opposite sides of the rotating drum 100 (180 degrees apart). The playback heads PA and PB are similarly installed on opposite sides of the rotating drum 100 (180 degrees apart). The playback head PA is installed a degrees ahead (relative to the direction of rotation of the rotating drum 100) of the record head RA. The value of the angle α can be set as desired, but for purposes of this explanation, it shall be 90 degrees.

Figure 7:
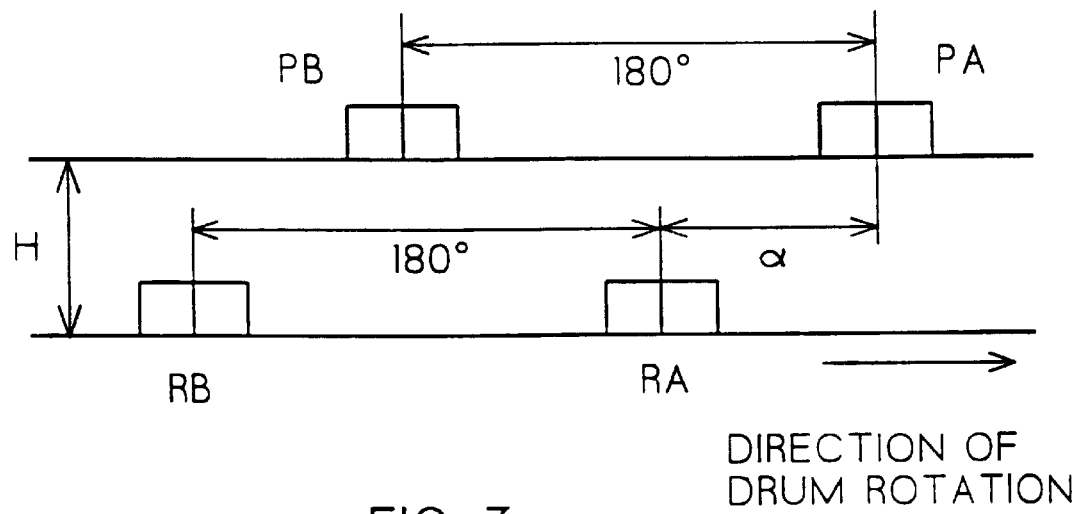
FIG. 7 shows the offset height relationships between the recording magnetic heads and playback magnetic heads of VTR-B (21) of FIG. 5.

FIG. 7 shows the installed offset relationships of the magnetic heads. In this working example, if n is the number of tracks by which the track being played back by the playback head is advanced with respect to the track being scanned by the record head, p (mm) is the track pitch, and α is the installation angle between the playback and record heads, then H, the offset difference in height between the record and playback heads of the recording and playback device (in millimeters), will be $$H = n \times p + (\alpha/180) \times p \quad (1)$$

In this working example, one frame of the digital signal is recorded by dividing it into 10 or 12 tracks. To recover the playback signal four frames in advance, then the playback head has to pick up its signal at least 40 tracks ahead of the record head position.

In equation (1), then if the number of tracks ahead, n, is 50, then with values of 0.02 mm for p and 90 degrees for α, the value of H will be:

$$H = 1 + 0.01 = 1.01 \text{ mm} \quad (2)$$

and if n were 55, for example, H would be 1.11 mm.

In the past, record and playback heads have never been offset, that is, separated in height as described above independent of any angular displacement.

Figure 8:
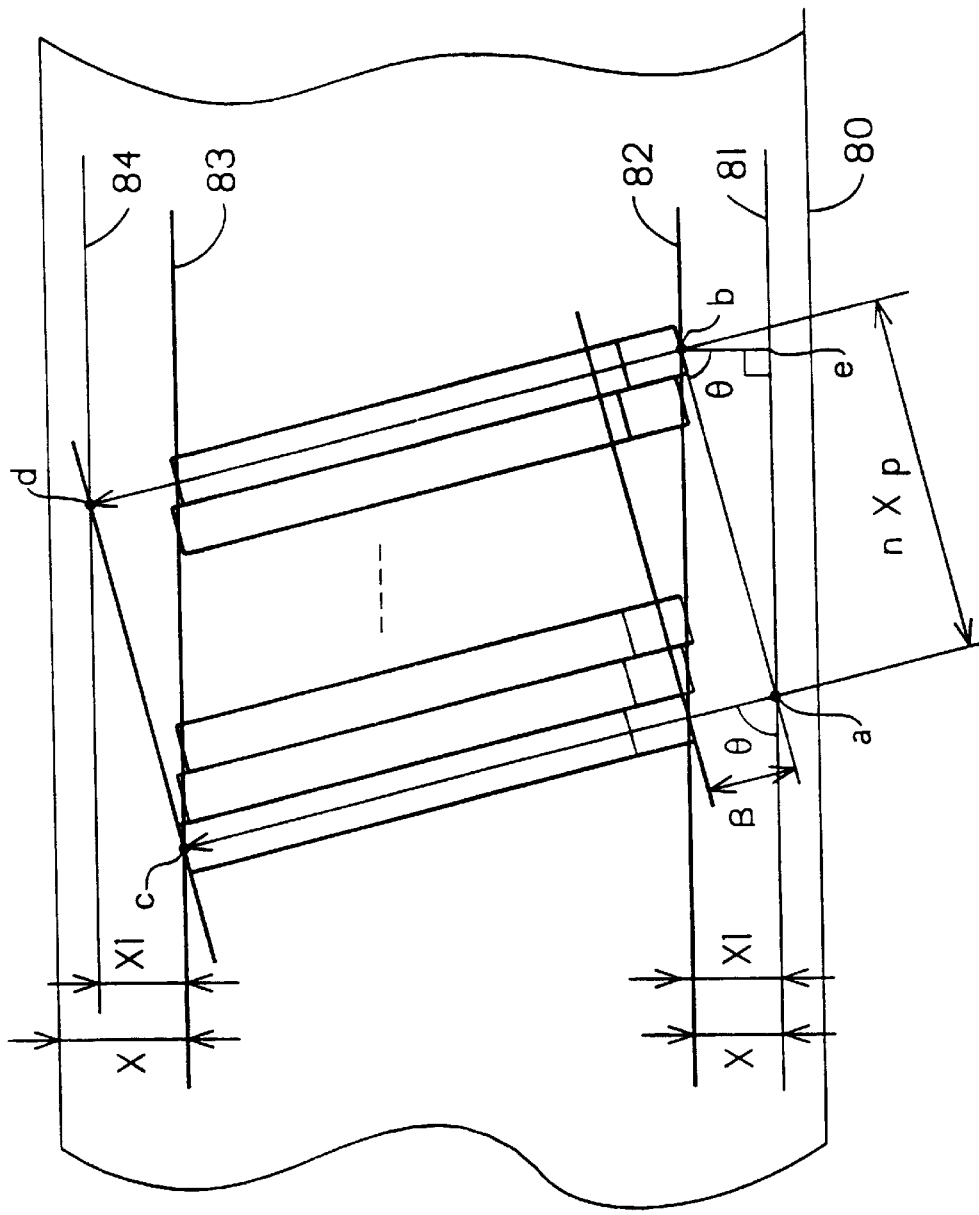
FIG. 8 shows track patterns on magnetic tape for the purpose of explaining the magnetic recording and playback method of the present invention.

FIG. 8 shows track patterns on magnetic tape for the purpose of explaining the magnetic recording and playback method of the present invention. That is, it shows track patterns that will be formed on the magnetic tape if editing is performed in an editing system, such as that shown in FIG. 5, using recording and playback devices configured as described above.

When a record head is recording in track TR, the point at which the record head first makes contact with the magnetic tape is point a, and the point at which it breaks contact with the tape is point c. The track being scanned by the playback head during this time is track TRn. Also, the point at which the playback head first makes contact with the magnetic tape is point b, and the point at which it breaks contact is point d. Accordingly, in the present invention, in order to cause the tracks to be formed in the area between lines 82 and 83 extending lengthwise along the magnetic tape, passing through points b and c, respectively; that is, the area that can be scanned in common by record heads RA and RB and playback heads PA and PB, the record timing is offset by an amount equivalent to the distance β from point a. With the pattern formed this way, a track TR recorded by a record head can be accurately played back by the corresponding playback head.

Since at this time, track pitch p (mm), the distance represented by line segment ab is equivalent to the "number of tracks ahead," n, and the angle formed by points abe is θ, X1 (mm), the distance between line 81 (through point a) and line 82 is presented as follows:

$$X1 = n \times p \times \cos\theta \quad (3)$$

Similarly, the distance between lines 83 and 84 passing through points c and d (the points at which the record and playback heads, respectively, break contact with the magnetic tape) is also equal to X1 (mm).

If the recording start point on the tape is set as described above, using magnetic tape of the same width, the tracks will be shorter than in prior systems.

In conventional VHS recording and playback equipment, for example, audio and control tracks are formed lengthwise on the tape in the space between the edge of the tape and the diagonally formed video tracks. The area for this purpose is set to extend approximately 1 mm inward from the edge of the tape. If such recording and playback equipment were used to record and reproduce digital signals, the starting points of the diagonal tracks would be approximately 1+X1 (mm) from the edge of the tape. These diagonal tracks would therefore be significantly shorter than standard VHS video tracks.

Figure 9:
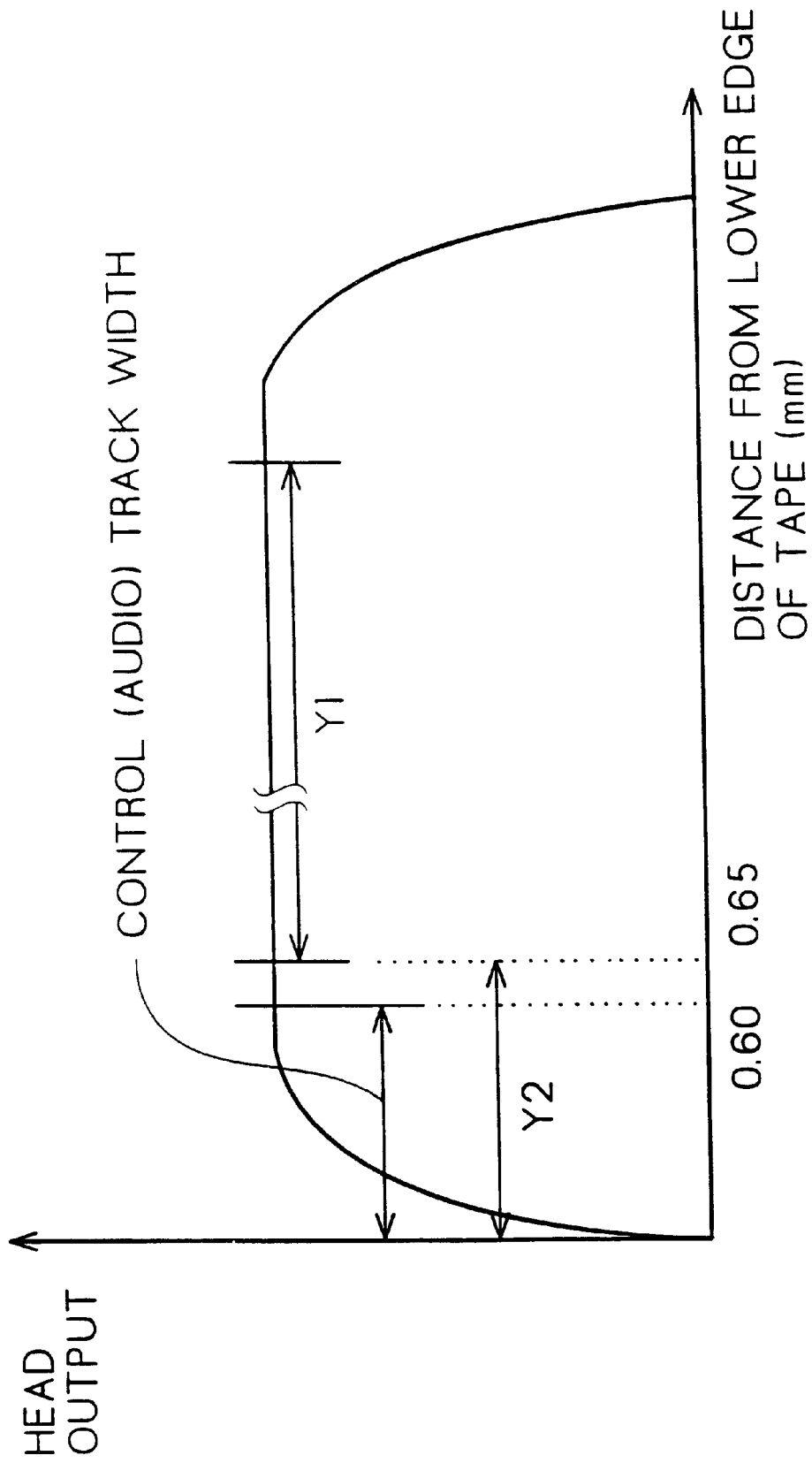
FIG. 9 shows the relationship between the playback output level from a magnetic head scanning a magnetic tape, and its distance from a lower reference edge of the tape.

This suggests taking a look at the distance between line 81 and the lower edge of the tape (80) for a way to make the recorded tracks as long as possible. Experiments were conducted to measure the output levels obtained from a head scanning between the lower edge (80) and top edge of a common 10-to-20-micron-thick magnetic tape. As shown in FIG. 9, these experiments demonstrated that a constant output level can be obtained over a prescribed interval (Y1 in FIG. 9) from a point 0.65 mm from the lower edge (80) of the tape. Over the range extending from the lower tape edge 80 (reference edge 80) to a point 0.65 mm inward therefrom (Y2 in FIG. 9), the force of contact between the head and the tape is not constant. This can result in abnormal head wear, which can cause the heads to damage the tape. Within this range, the playback output from the head is also greatly diminished.

Accordingly, if the distance between line 81 and the lower tape edge 80 (FIG. 8) is set at 0.65 mm, the distance between lines 82 and 83 can be made longer. In other words, this provides the longest diagonal track length that can be scanned in common by the record and playback heads.

Based on the foregoing, if X (mm) is the distance between the magnetic tape reference edge 80 and the track starting point (line 82), then:

$$X = 0.65 + X1 \quad (4)$$

From equation (3), then, X can be determined as follows:

$$X = 0.65 + n \times p \times \cos\theta \quad (5)$$

The distance between the reference edge on the other side of the tape and the end points of the diagonal tracks (the distance between the reference edge and line 83) may also be set to X.

In practice, VTR-B (21) records video signals by dividing the signal for one frame into either 10 or 12 tracks (10 tracks for 525-scan-line, 60-field video, or 12 tracks for 625-scan-line, 50-field video).

In this VTR-B (21), the time required for record and playback signal processing (the interval between the time the signal is picked up by the playback head and the time it is recorded by the record head), constitutes a delay equivalent to at least four frames (40 tracks of 525/60 video or 48 tracks of 625/50 video) plus two additional tracks, or, allowing for error, a total delay of at least five frames (50 to 55 tracks). For example, the proper difference in the installed heights of the record and playback heads for a track pitch of 0.02 mm (20 microns), as described earlier, and a diagonal track inclination angle of 6 degrees (actually, 5.95892 degrees), would be between approximately 1.1 and 1.0 mm. In other words, the start of the tracks should be set to between 1.65 and 1.75 mm (1.7±0.05 mm) from the lower edge of the tape; and with L (mm) as the tape width, the other ends of the tracks should be set to L−(1.7±0.05) mm from the lower reference edge of the tape.

For a ½-inch (12.65 mm) tape, the pattern should be formed to place the track start and end points 1.7±0.05, and 10.95±0.05 mm, respectively, from the lower reference edge of the tape.

As described above, with the recording and playback method of the present invention, insertion editing of digital data signals can be performed with no playback signal and time code adjustments required. For this reason, accurate read-before-write editing can also be performed. Also, not only is insertion editing made possible, as discussed above, but the size of the track area on the magnetic tape in which recording can be performed is also maximized. The method also causes heads to wear evenly, preventing damage to both the heads and the recording tape.

Various modifications will become possible for those skilled in the art after receiving the teachings of the present disclosure without departing from the scope thereof.

What is claimed is:

1. A magnetic recording and playback method for forming diagonal tracks on a magnetic tape while recording and playing back a digital data signal comprising a step of mounting a record head for recording said diagonal tracks and a playback head for playing back said tracks on a rotating drum in an arrangement so that said record head and said playback head are angularly displaced from one another relative to the longitudinal axis of the rotating drum and are offset from one another on different planes lying normal to said longitudinal axis, with said offset defining a predetermined distance H corresponding to at least the minimum time required to absorb a signal transfer delay time necessary for record processing and playback processing of said digital data signal with the predetermined distance H and wherein with L as a width of said magnetic tape, said diagonal tracks are formed on said magnetic tape from a starting point relative to an outer edge of said tape extending along the lengthwise direction thereof and representing the reference edge, with the starting point computed from a point located "X" distance from said reference edge and with an end point (L-X) distance from said reference edge in accordance with the following relationship:

$$X = 0.65 + n \times p \times \cos\theta$$

where n is the number of tracks, p is the track pitch, and $\theta$ is the angle of inclination of said diagonal tracks with respect to the lengthwise direction of said magnetic tape.

2. The magnetic recording and reproducing method of claim 1, wherein with 12.65 mm as the width of said magnetic tape, when a digital signal corresponding to one frame of video is recorded in from 10 to 12 tracks at a track pitch of 20 $\mu$m, said diagonal tracks have their staring points located 1.70±0.05 mm from said reference edge, and their end points located 10.95±0.05 mm from said reference edge.

* * * * *